(12) United States Patent
Bellomo

(10) Patent No.: US 10,184,660 B2
(45) Date of Patent: Jan. 22, 2019

(54) GAS DISTRIBUTION SYSTEM AND COOKING APPLIANCE INCORPORATING THE GAS DISTRIBUTION SYSTEM

(71) Applicant: COPRECI, S. COOP, Aretxabaleta (ES)

(72) Inventor: Alberto Bellomo, Ponzano (IT)

(73) Assignee: COPRECI, S. COOP., Aretxabaleta (ES)

( * ) Notice: Subject to any disclaimer, the term of this patent is extended or adjusted under 35 U.S.C. 154(b) by 0 days.

(21) Appl. No.: 15/491,370

(22) Filed: Apr. 19, 2017

(65) Prior Publication Data

US 2017/0314783 A1    Nov. 2, 2017

(30) Foreign Application Priority Data

Apr. 27, 2016   (ES) .................................. 201630540

(51) Int. Cl.
*F24C 3/12*    (2006.01)
*F23N 1/00*    (2006.01)
(Continued)

(52) U.S. Cl.
CPC .............. *F23N 1/007* (2013.01); *F16L 41/12* (2013.01); *F16L 41/16* (2013.01); *F24C 3/12* (2013.01);
(Continued)

(58) Field of Classification Search
CPC .... F16K 5/0228; F16K 5/0292; F16K 5/0428; F16K 5/0492; F16K 5/0621;
(Continued)

(56) References Cited

U.S. PATENT DOCUMENTS 1,467,824 A * 9/1923 Ahlers .................... F16B 39/36
 403/408.1
1,662,640 A * 3/1928 Garretson ................ F24C 3/12
 126/42

(Continued)

FOREIGN PATENT DOCUMENTS

CA       2829546 A1    4/2015
EP        389783 B1    3/1993
(Continued)

OTHER PUBLICATIONS

Spanish Written Opinion and Search Report in corresponding Spanish Patent Application No. P201630540, dated Nov. 28, 2016, with translation.

*Primary Examiner* — Reinaldo Sanchez-Medina
*Assistant Examiner* — David Colon Morales
(74) *Attorney, Agent, or Firm* — Edell, Shapiro & Finnan, LLC

(57) ABSTRACT

According to one embodiment a gas distribution assembly is provided that includes a gas distribution duct and at least one gas regulating valve mounted on the gas distribution duct. The valve is secured to the duct by use of a support supported on the duct and attachment means for attaching the valve to the support. According to one embodiment the attachment means comprises a screw threaded into a threaded sleeve and also into a threaded hole in the body of the valve. The support includes a through hole through which the sleeve passes and the sleeve includes a flange at one end that rests on the support in an area that surrounds the through hole. An end of the sleeve opposite the flange resides adjacent the threaded hole in the body of the valve.

19 Claims, 4 Drawing Sheets

(51) Int. Cl.
*F16L 41/12* (2006.01)
*F16L 41/16* (2006.01)

(52) U.S. Cl.
CPC ..... *F23N 2035/24* (2013.01); *Y10T 137/6123* (2015.04)

(58) Field of Classification Search
CPC .... F16K 5/0626; F23N 1/007; F23N 2035/00; F23N 2035/12; F23N 2035/24; F24C 3/12; Y10T 137/6123; F16L 41/06; F16L 41/065; F16L 47/345; F16L 41/086; F16L 41/12; F16B 19/02; F16B 43/00; F16B 31/00; F16B 31/06; F16B 31/21
USPC ........................................................ 251/340
See application file for complete search history.

(56) References Cited

U.S. PATENT DOCUMENTS

| | | | | |
|---|---|---|---|---|
| 1,758,960 | A * | 5/1930 | Mendelson | F24C 3/12 126/42 |
| 1,869,764 | A * | 8/1932 | Methudy | F24C 3/12 126/39 B |
| 2,896,975 | A * | 7/1959 | Wahl | B21C 37/29 126/39 N |
| 4,763,695 | A * | 8/1988 | Dooley | F16L 21/005 138/109 |
| 5,348,048 | A * | 9/1994 | Schirado | B67D 1/1256 137/588 |
| 5,697,650 | A * | 12/1997 | Brown | B05B 15/658 285/197 |
| 6,227,786 | B1 | 5/2001 | Tateyama | |
| 6,623,226 | B2 | 9/2003 | Braun et al. | |
| 6,872,040 | B2 | 3/2005 | Deeg et al. | |
| 7,299,799 | B2 * | 11/2007 | Albizuri | F24C 3/12 126/39 BA |
| 2002/0009350 | A1 | 1/2002 | Radtke | |
| 2007/0012310 | A1 * | 1/2007 | Huang | F24C 3/12 126/39 N |
| 2008/0019794 | A1 | 1/2008 | Van Walraven | |
| 2008/0145179 | A1 | 6/2008 | Amann et al. | |
| 2012/0133128 | A1 | 5/2012 | Bohl | |

FOREIGN PATENT DOCUMENTS

| | | | |
|---|---|---|---|
| ES | 1077154 U | 6/2012 | |
| FR | 1349374 A * | 1/1964 | ........... F16K 5/0292 |
| GB | 2069648 A * | 8/1981 | |

* cited by examiner

GAS DISTRIBUTION SYSTEM AND COOKING APPLIANCE INCORPORATING THE GAS DISTRIBUTION SYSTEM

CROSS-REFERENCE TO RELATED APPLICATIONS

This application relates to and claims the benefit and priority to Spanish Patent Application No. P201630540, file Apr. 27, 2016.

TECHNICAL FIELD

The present invention relates to gas distribution assemblies comprising gas regulating valves mounted on a gas distribution duct, and gas cooking appliances incorporating said gas distribution assemblies.

BACKGROUND

Gas distribution assemblies for gas cooking appliances are known, and they are equipped with rotary-type manually operated gas valves and a duct distributing the gas. The valves are mounted in the duct in fluid communication with said duct, and they are fixed to the duct being attached to a support.

Safety issues due to gas leaks occurring because the attachment means have sustained some sort of mishap, such as breaking, for example, are known.

ES1077154U describes a gas distribution assembly suitable for being mounted in a gas cooking appliance, comprising a gas distribution duct suitable for being connected to a gas connection, at least one gas regulating valve mounted on said gas distribution duct, a support which is associated with said gas regulating valve and supported on said gas distribution duct, and attachment means for attaching each gas regulating valve with the support, the attachment means comprising at least one screw.

SUMMARY OF THE DISCLOSURE

According to some embodiments a gas distribution assembly is provided that comprises a gas distribution duct suitable for being connected to a gas connection, at least one gas regulating valve mounted on said gas distribution duct, a support which is associated with said gas regulating valve and supported on said gas distribution duct, and attachment means for attaching at least one attachment area of each gas regulating valve with at least one attachment area of the respective support. The attachment means comprises at least one screw, one of the attachment areas comprising a through hole which the screw goes through, the other attachment area comprising a threaded hole, and the end of the screw being screwed into said threaded hole.

The attachment means comprises a sleeve with an inner threaded section, the screw being screwed into the inner threaded section of the sleeve, and the sleeve comprising stop means that is supported on the contour of the through hole, that is, an area that surrounds or partially surrounds the through hole.

If for any reason the screw breaks in any area of its length comprised between the gas regulating valve and the support, said valve and said support will continue to be attached and maintain the tightening torque since the threaded section attaching the screw and the sleeve is maintained, and the sleeve cooperates with the contour of the through hole by means of the stop means. The contour being an area that surrounds or partially surrounds the through hole. The safety issues due to gas leaks occurring because one of the screws has broken are thereby prevented. It is a simple, easy-to-implement and low-cost solution.

These and other advantages and features will become evident in view of the drawings and detailed description.

DETAILED DESCRIPTION

Figure 1:
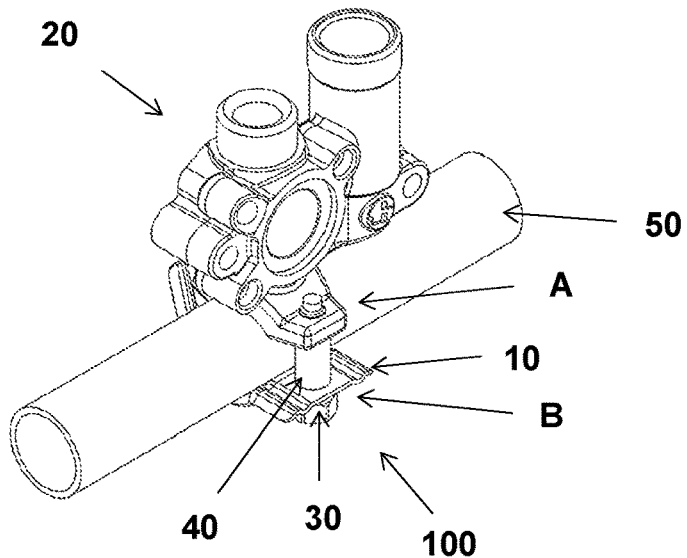
FIG. 1 shows a perspective view of an embodiment of a gas distribution assembly of the invention.
Figure 2:
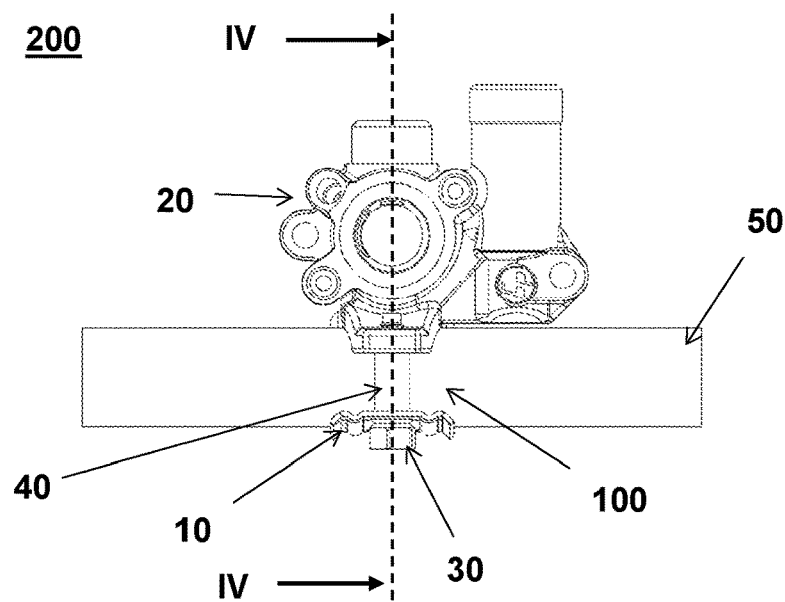
FIG. 2 shows an elevational view of the gas distribution assembly of FIG. 1.
Figure 3:
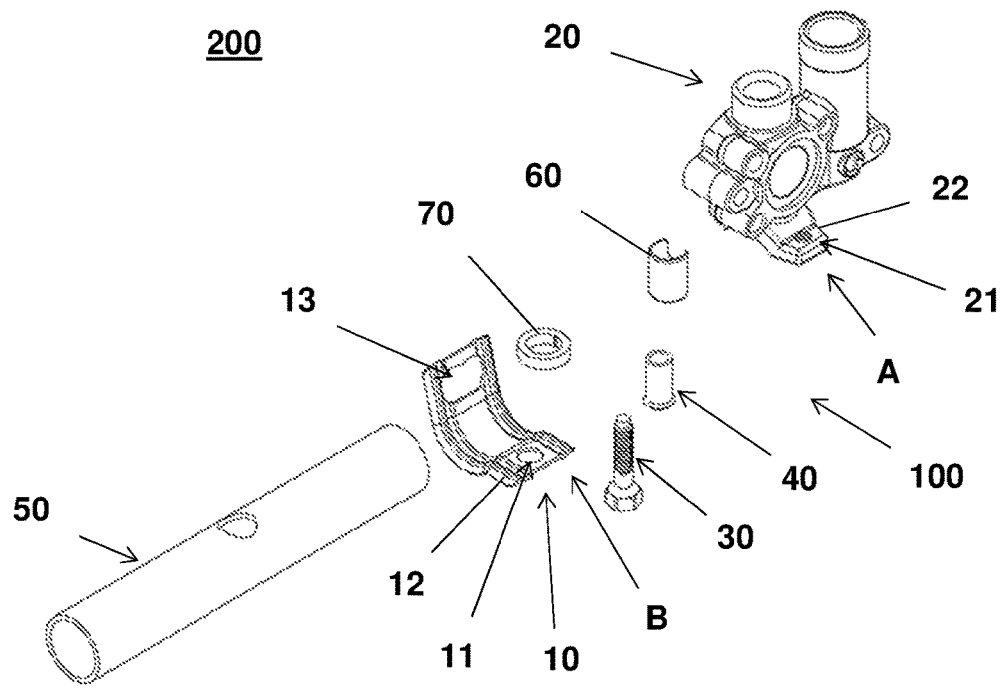
FIG. 3 shows an exploded perspective view of the parts of the gas distribution assembly of FIG. 1.

FIG. 1 shows a perspective view of a gas distribution assembly 200 according to one embodiment. FIG. 2 shows an elevational view of the gas distribution assembly 200 of FIG. 1, and FIG. 3 shows an exploded perspective view of the parts of the gas distribution assembly 200 of FIG. 1.

The gas distribution assembly 200 comprises a gas distribution duct 50 which is elongated tube having a circular section, suitable for being connected to a gas connection, not shown in the drawings. In other embodiments of the gas distribution assembly, not shown in the drawings, the gas distribution assembly can have other configurations, with square sections or other shapes.

As many gas regulating valves as required are mounted in a linear manner on the gas distribution duct 50 in the gas cooking appliance, only one gas regulating valve 20 being shown in the drawings. In other embodiments of the gas distribution assembly, not shown in the drawings, instead of gas regulating valves they can be gas regulating cocks. Each valve has an associated support 10 which is supported on the gas distribution duct 50. The gas distribution assembly 200 also comprises attachment means 100 which allow attaching an attachment area A of the gas regulating valve 20 with an attachment area B of the support 10, the gas distribution duct 50 being arranged between the gas regulating valve 20 and the support 10. In other embodiments of the gas distribution assembly, not shown in the drawings, the gas regulating valves 20 can be associated with a single support.

In this embodiment of the gas distribution assembly 200, the attachment means 100 comprise a screw 30 and a sleeve 40. The screw 30 comprises a head 31 and a shank 32 with a diameter 35 comprising a threaded section 33 projecting from the diameter 35 of the shank 32, the threaded section 33 starting at one end 34 of said screw 30 and ending before the head 31. The sleeve 40 is a hollow plastic cylinder but it can be made of other materials, such as metal, for example, with a body 45 and a side wall 46, comprising an inner threaded section 41 running along the entire length of the side wall 46, but in other embodiments of the sleeve it can run partially along the length of the side wall 46. An upper end 43 of the sleeve 40 comprises stop means comprising a flange 44 along a portion or the entire perimeter, extending outwardly from the side wall 46 of the body 45 at an angle. In other embodiments of the sleeve 40, not shown in the drawings, the flange 44 extends radially outwards, that is, perpendicular to the side wall 46.

When each gas regulating valve 20 is attached with each support 10, first each screw 30 is attached with each sleeve 40 by screwing the threaded section 33 of the screw 30 all the way into the inner threaded section 41 of the sleeve 40, and one end of the screw 30 projecting from the sleeve 40.

Then, with the screw 30 incorporating the sleeve 40, the gas regulating valve 20 and the support 10 are attached, the flange 44 of the upper end 43 of the sleeve 40 being supported on the support 10. In other embodiments of the gas distribution assembly, not shown in the drawings, the sleeve 40 can be supported on the gas regulating valve 20.

In the embodiment of the gas distribution assembly 200 shown, the support 10 is a flexible tie comprising a hole 13 at a first end, and at a second end it comprises the attachment area B comprising a through hole 11, with a diameter greater than the outer diameter of the body 45 of the sleeve 40, the rest being a surface 12. In this embodiment of the support 10, said surface 12 comprises a chamfer 14 around the through hole 11. The gas regulating valve 20 comprises an arcuate mounting seat for being superimposed on the gas distribution duct 50, said mounting seat comprising two ends laterally projecting from the body of the gas distribution duct 50, when the gas regulating valve 20 is mounted on the gas distribution duct 50. One of the ends of the mounting seat comprising the attachment area A of the gas regulating valve 20 has a surface 22 with a threaded hole 21 going through it.

Figure 4:
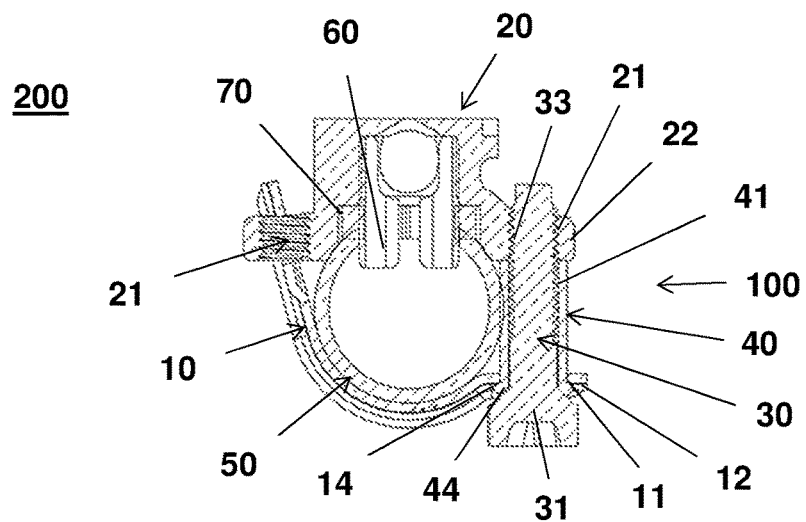
FIG. 4 shows a partial section view of the distribution assembly of FIG. 1 according to line IV-IV of FIG. 2, the gas regulating valve being partially shown.
Figure 5:
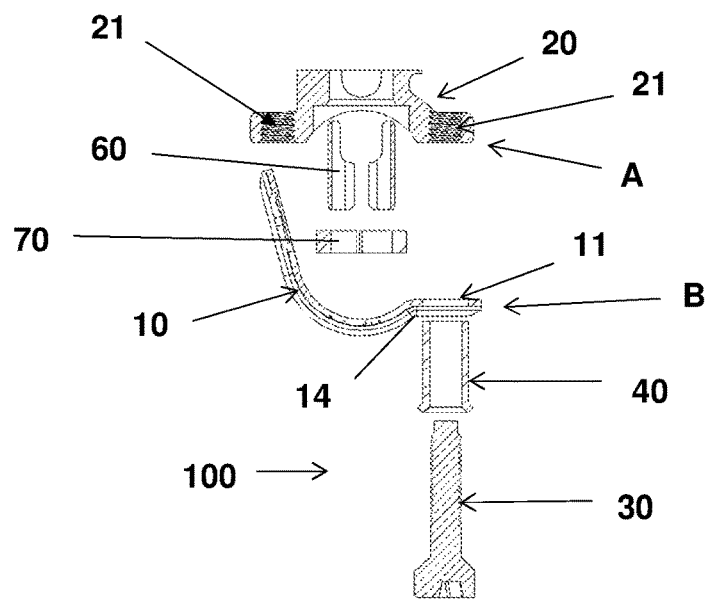
FIG. 5 shows a front exploded view of the parts of the gas distribution assembly of FIG. 1.
Figure 6:
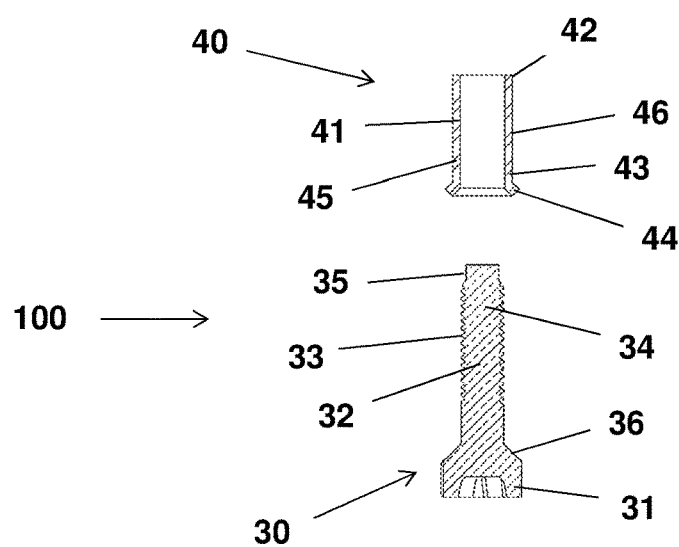
FIG. 6 shows a front section view of the screw and of the sleeve of the attachment means of the gas distribution assembly of FIG. 1.

FIG. 4 shows a partial section view according to line IV-IV of FIG. 2, the gas regulating valve 20 being partially shown. FIG. 5 shows a front exploded view of the parts of the gas distribution assembly 200 of FIG. 1, and FIG. 6 shows a front section view of the screw 30 and of the sleeve 40 of the attachment means 100 of the gas distribution assembly 200 of FIG. 1.

According to some embodiments the gas distribution duct 50 comprises one hole for each gas regulating valve 20, and each gas regulating valve 20 also comprises one inlet hole in fluid communication with the corresponding hole of the gas distribution duct 50, when the gas regulating valve 20 is mounted on the gas distribution duct 50. The gas distribution assembly 200 also comprises a smooth sleeve 60 usually made of metal and a washer 70 made of elastomer for each attachment of gas regulating valve 20 and gas distribution duct 50. Before mounting the gas regulating valve 20 and the gas distribution duct 50, the smooth sleeve 60 is mounted in the inlet hole of the gas regulating valve 20, and the washer 70 is mounted around the smooth sleeve 60 and is housed in a housing of the gas regulating valve 20 arranged for that purpose. Therefore, when the gas regulating valve 20 is mounted on the gas distribution duct 50, the assembly formed by the smooth sleeve 60 and the washer 70 allows preventing gas leaks through said attachment area.

For attaching the gas regulating valve 20 and the support 10 and generating a tightening torque between both parts that assures leak-tightness, first the support 10 engages the gas regulating valve 20 by introducing the end of the mounting seat of the gas regulating valve 20 that does not have the threaded hole 21 into the hole 13 of the first end of the support 10. The screw 30 with the incorporated sleeve 40 is introduced at the second end of the support 10, in attachment area B, through the through hole 11 of the support 10. The lower end 34 of the screw 30 is screwed into the attachment area A in the threaded hole 21 of the gas regulating valve 20, and as it is being screwed in, the flange 44 of the upper end 43 of the sleeve 40 is supported on the contour of the through hole 11, said flange 44 being supported at an angle on the chamfer 14 of the surface 12 of the support 10 which is around the through hole 11, said flange 44 projecting from the chamfer 14. The inclination of the flange 44 of the sleeve 40 and of the chamfer 14 of the surface 12 of the support 10 are the same, such that said flange 44 with the chamfer 14 are supported on an aligned manner.

The head 31 of the screw 30 has a contact surface 36 in its lower part, which in this embodiment of the screw 30 is at an angle, but in other embodiments not depicted in the drawings, it is flat. When the contact surface 36 of the screw 30, since it is threaded, is supported on the flange 44 of the sleeve 40, which in turn is supported on the surface 12 of the support 10, a tightening torque between the gas regulating valve 20 and the support 10 is generated. So if for any reason the screw 30 breaks in any area of its length comprised between the gas regulating valve 20 and the support 10, for example at the level of the head 31 or in an intermediate area of the shank 32, said valve 20 and said support 10 will continue to be attached and the tightening torque maintained, since the threaded section attaching the screw 30 with the sleeve 40 always maintains a threaded area, and the sleeve 40 remains supported on the support 10, with the flange 44 acting as the head 31 of the screw 30. Safety issues due to gas leaks occurring because one of the screws has broken are thereby prevented.

If the tightening torque is not correctly defined and controlled in the application thereof, it can cause problems relating to deformations, and even one of the parts of the gas distribution assembly 200 could break. To prevent this, the sleeve 40 of the embodiment of the gas distribution assembly 200 shown in the drawings has such a length that the lower end 42 of the sleeve 40, opposite the upper end 43, is supported on the surface 22 of the gas regulating valve 20 where the threaded hole 21 is located when the defined tightening torque is reached. Therefore, it is the sleeve 40 itself that exerts a mechanical stop for screwing in the screw 30 between the gas regulating valve 20 and the support 10. In other embodiments of the gas distribution assembly not shown in the drawings, the sleeve 40 is not long enough to act as a mechanical stop, in which case the tightening torque is limited by other means, such as using screwing tools with torque control, for example.

In other embodiments of the gas distribution assembly not shown in the drawings, the flange 44 of the sleeve 40 does not project from the chamfer 14 of the surface 12, and the contact surface 36 of the head 31 of the screw 30 is supported on said surface 12. In other embodiments, the surface 12 does not present the chamfer 14, and the flange 44 of the sleeve 40 is radial, the flange 44 being supported in this case on the surface 12, and the contact surface 36 of the screw 30 is supported on the flange 44. In this final embodiment, the contact surface 36 of the screw 30 is an outer annular surface, the inside being hollow, such that said hollow space frees up the flange 44, and the contact surface 36 of the screw 30 is supported on the surface 12. Even in other embodiments of the gas distribution assembly not shown in the drawings, the surface 12 of the support 10 has a recess and the flange 44 of the sleeve 40 is housed in said recess. Therefore, the head 31 of the screw 30 may also be housed in the recess, in which case the contact surface 36 is supported on the flange 44, or it may not be housed therein, in which case the contact surface 36 is supported on the surface 12 of the support 10.

Figure 7:
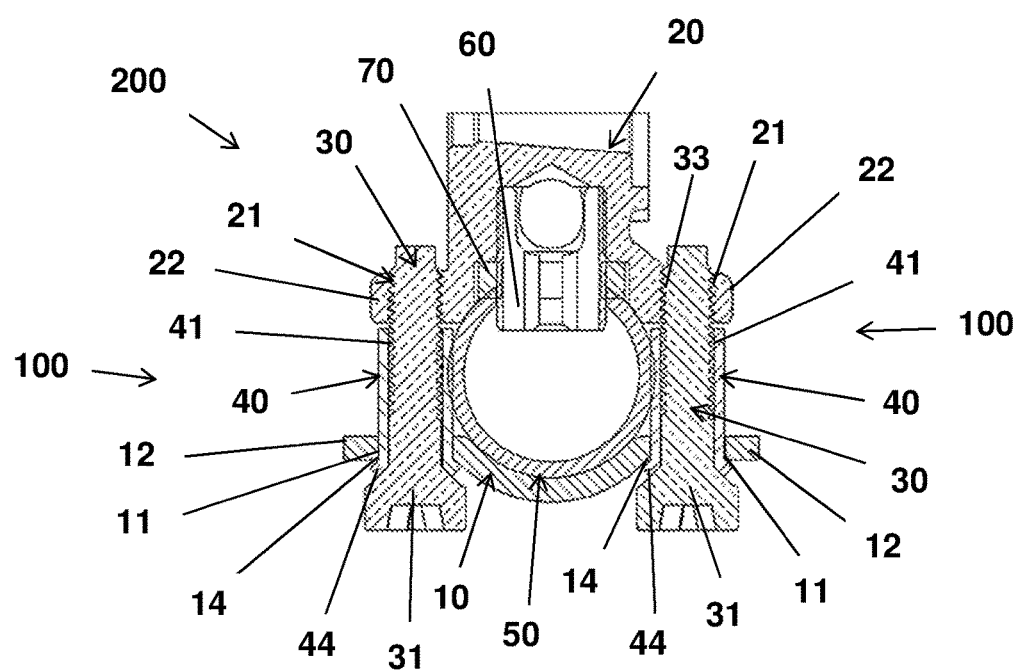
FIG. 7 is a front sectional view of a gas distribution sleeve according to another embodiment.

In other embodiments of the gas distribution assembly as shown in FIG. 7, the two ends of the mounting seat of the gas regulating valve 20 each comprise an attachment area A comprising the threaded hole 21. In that case, the support 10 also comprises at the first end an attachment area B, with a through hole 11 like that of the second end. The attachment means 100 for attaching the gas regulating valve 20 and the support 10 comprise two screws 30 and two sleeves 40, each screw 30 being housed screwed into each sleeve 40, each screw 30 and sleeve 40 assembly being inserted into the respective through hole 11, each screw 30 being screwed into the respective threaded hole 21, and the flange 44 of each sleeve 40 being supported on the contour of the respective through hole 11. The contour being an area that surrounds or partially surrounds the through hole.

What is claimed is:

1. A fluid distribution assembly comprising:
    a duct having a sidewall and an opening extending through the sidewall,
    a valve positioned on the duct, the valve having a valve body with an inlet in fluid communication with the duct via the opening in the sidewall of the duct, the valve body including a first threaded hole,
    a support configured to secure the valve to the duct, the support being supported on the duct and having a first through hole that is axially aligned with and spaced apart from the first threaded hole of the valve body, the support having a first side that faces toward the valve body and a second side that faces away from the valve body,
    a first sleeve extending through the first through hole of the support, the first sleeve having a first open end, a second open end, an inner threaded section and a flange located at the first open end, the second open end located adjacent the first threaded hole of the valve body, the flange supported on the second side of the support on an area that at least partially surrounds the first through hole; and
    a first screw having a threaded section that engages both the inner threaded section of the first sleeve and the first threaded hole of the valve body, the first screw having a head that resides on the second side of the support.

2. The fluid distribution assembly according to claim 1, wherein the area on the second side of the support comprises a recess, the flange of the first sleeve at least partially residing in the recess.

3. The fluid distribution assembly according to claim 1, wherein the head of the first screw comprises a contact surface that is supported on the flange of the first sleeve.

4. The fluid distribution assembly according to claim 1, wherein the head of the first screw comprises a contact surface that is supported on the second side of the support on an area that at least partially surrounds the first through hole.

5. The fluid distribution assembly according to claim 1, further comprising a chamfer located on the first side of the support and that surrounds the first through hole of the support, the flange having an angled external surface that mates with the chamfer.

6. The fluid distribution assembly according to claim 1, wherein the second open end of the first sleeve is supported on the valve body on an area that at least partially surrounds the first threaded hole.

7. The fluid distribution assembly according to claim 1, wherein the first sleeve has a length and the inner threaded section runs substantially the entire length of the first sleeve.

8. The fluid distribution assembly according to claim 1, wherein the first sleeve is made of a plastic.

9. The fluid distribution assembly according to claim 1, wherein the support comprises a flexible tie, the tie having a first end and a second end, the first end being coupled to the valve body, the first through hole being located adjacent the second end of the tie.

10. The fluid distribution assembly according to claim 1, wherein
    the valve body includes a second threaded hole, the first threaded hole and second threaded hole being located on opposite sides of the duct,
    the support includes a second through hole spaced apart from the first through hole, the second through hole being axially aligned with and spaced apart from the second threaded hole,
    a second sleeve extending through the second through hole of the support, the second sleeve having a first open end, a second open end, an inner threaded section and a flange located at the first open end, the second open end located adjacent the second threaded hole in the valve body, the flange of the second sleeve supported on the second side of the support on an area that at least partially surrounds the second through hole; and
    a second screw having a threaded section that engages both the inner threaded section of the second sleeve and the second threaded hole of the valve body, the second screw having a head that resides on the second side of the support.

11. A fluid distribution assembly comprising:
    a duct having a sidewall and an opening extending through the sidewall,
    a valve positioned on the duct, the valve having a valve body with an inlet in fluid communication with the duct via the opening in the sidewall of the duct, the valve body including a part that includes a first through hole extending between first and second opposing sides of the part,
    a support configured to secure the valve to the duct, the support being supported on the duct and having a first threaded hole that is axially aligned with and spaced apart from the first through hole of the valve body, the support having a first side that faces toward the valve body and a second side that faces away from the valve body, the first side of the part of the valve body facing away from the support, the second side of the part of the valve body facing toward the support,
    a first sleeve extending through the first through hole of the valve body, the first sleeve having a first open end, a second open end, an inner threaded section and a flange located at the first open end, the second open end located adjacent the first threaded hole of the support, the flange supported on the first side of the part of the valve body on an area that at least partially surrounds the first through hole; and
    a first screw having a threaded section that engages both the inner threaded section of the first sleeve and the first threaded hole of the support, the first screw having a head that resides on the first side of the part of the valve body.

12. The fluid distribution assembly according to claim 11, wherein the area on the second side of the part of the body comprises a recess, the flange of the first sleeve residing in the recess.

13. The fluid distribution assembly according to claim 11, wherein the head of the first screw comprises a contact surface that is support on the flange of the first sleeve.

14. The fluid distribution assembly according to claim 11, wherein the head of the first screw comprises a contact surface that is supported on the first side of the part of the valve body on an area that at least partially surrounds the first through hole.

15. The fluid distribution assembly according to claim 11, wherein the second open end of the first sleeve is supported on the first side of the support on an area that at least partially surrounds the first threaded hole.

16. The fluid distribution assembly according to claim 11, wherein the first sleeve has a length and the inner threaded section runs substantially the entire length of the first sleeve.

17. The fluid distribution assembly according to claim 11, wherein the first sleeve is made of a plastic.

18. The fluid distribution assembly according to claim 11, wherein the support comprises a flexible tie, the tie having a first end and a second end, the first end being coupled to the valve body, the first threaded hole being located adjacent the second end of the flexible tie.

19. The fluid distribution assembly according to claim 11, wherein the valve body includes a second through hole, the first through hole and second through hole being located on opposite sides of the duct, the support includes a second threaded hole spaced apart from the first threaded hole, the second threaded hole being axially aligned with and spaced apart from the second through hole, a second sleeve extending through the second through hole of the valve body, the second sleeve having a first open end, a second open end, an inner threaded section and a flange located at the first open end, the second open end located adjacent the second threaded hole in the support, the flange of the second sleeve supported on the first side of the part of the valve body on an area that at least partially surrounds the second through hole; and a second screw having a threaded section that engages both the inner threaded section of the second sleeve and the second threaded hole of the support, the second screw having a head that resides on the first side of the part of the valve body.

\* \* \* \* \*